United States Patent Office 3,008,183
Patented Nov. 14, 1961

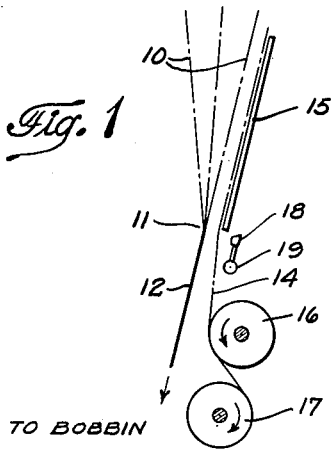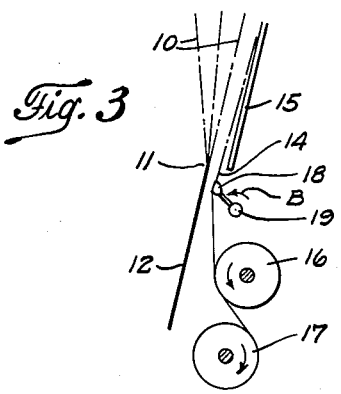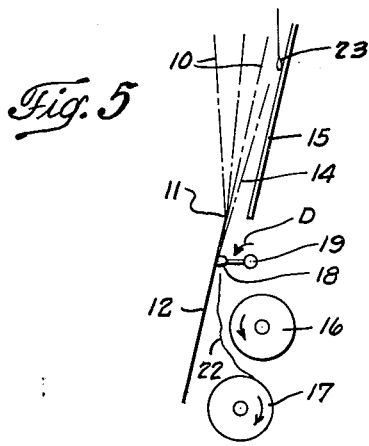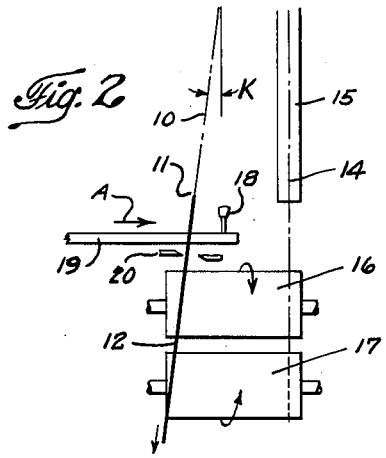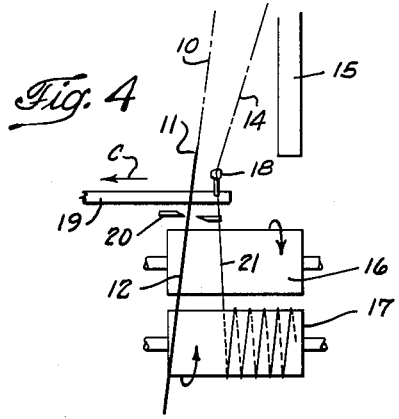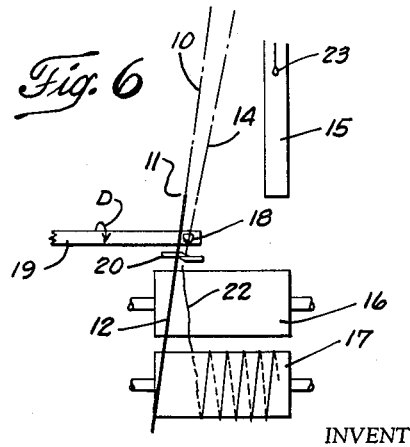

3,008,183
METHOD AND APPARATUS FOR THE PRODUCTION OF FILAMENTS OF GLASS OR LIKE THERMOPLASTIC MATERIALS
Werner Schuller, Fort Saskatchewan, Alberta, Canada; and Wolfgang Schuller, Faserweg; Heinz Keib, Alte Steige; and Harald Hohlfeld, Heinrich Geisslerstrasse, all of Wertheim am Main, Germany
Filed Apr. 14, 1958, Ser. No. 728,468
Claims priority, application Germany Apr. 17, 1957
15 Claims. (Cl. 18—8)

The invention relates to a method and apparatus for producing glass and similar thermoplastic filaments and more particularly to an automatic method and apparatus for such production.

The operation of drawing filaments, gathering them into a strand, and winding them on bobbins is known. If glass is used as the raw material the product thus formed, hereinafter referred to as "continuous strands," may be used for widely varying purposes. In the form of fabrics, rovings, or in the form of cut short pieces or staples, the product serves advantageously as an insulating medium or as reinforcing means. In the plastic industry substantial quantities of continuous strands are used as reinforcement for glass fiber-reinforced plastics.

Glass as a raw material exhibits a high resistance to chemical action and in the form of glass fibres has advantageous physical properties. It is particularly in the plastic industry that these advantageous physical properties are utilized in the reinforcement of plastics, such for example as polyesters, melamine, phenolic resins and the like.

The primary product used in the plastic industry involves continuous strands which represent a structure comprising continuous, endless glass filaments of which 100 or 200—depending on the method of production used—are combined by means of a binding agent to produce an endless strand.

In order to insure uniformity of the strand, breakage of the individual filaments must be avoided during the winding operation. This cannot always be avoided since even slight variations in homogeneity, fluctuations in temperature during the spinning process and the like, may be sufficient to cause the glass filaments, which are relatively delicate, to break. In the production of strands from glass filaments the particular difficulty resides in producing new filaments sufficiently quickly to replace the broken filaments, and in introducing these newly formed filaments into the strand of filaments being wound on the bobbin.

In a known method the orifice through which the filament is drawn is closed when a filament breaks. If more than 3% of individual filaments in the strand break, the system is automatically disabled. The time required to introduce a new bobbin is then utilized to free the closed orifices, as for example by heating, and to manually integrate the new filaments issuing from the cleared orifices into the strand. In this spinning method it is impossible to maintain continuity of production of the strands whereby, for example, the strand is continuously transferred from a fully loaded bobbin to a new spindle.

It is also impossible in present practice to interrupt the formation of filaments during inoperability of the winding mechanism. Thus a high degree of discontinuity of operation is produced inasmuch as the filaments which are drawn off before the bobbins are ready to receive them have to be moved to one side and cannot be wound until fresh filaments issuing from the previously frozen orifices have been introduced into the strand of filaments.

It is thus an object of this invention to avoid these disadvantages and to provide continuous operation of spinning and spooling. More specifically, it is an object of this invention to overcome present difficulties associated with the breaking of filaments, whereby the broken filament is at once automatically reformed and introduced automatically and continuously into the strand of filaments.

A further object of the invention is to insure the automatic and continuous production of uniform strands by a method and system capable of automatic control and regulation.

Other objects and advantages of the invention will be set forth in part hereinafter and in part will be obvious herefrom, or may be learned by practice with the invention, the same being realized and attained by means of the instrumentalities and combinations pointed out in the appended claims.

The invention is diagrammatically illustrated by way of example in the accompanying drawings wherein:

FIG. 1 is a front elevation view of one stage of the process and apparatus.

FIG. 2 is a side elevation of the same stage.

FIG. 3 is a front elevation of a second stage of the process.

FIG. 4 is a side elevation of the second stage.

FIG. 5 is a front elevation of a third stage of the process.

FIG. 6 is a side elevation of the same stage.

Figure 7:
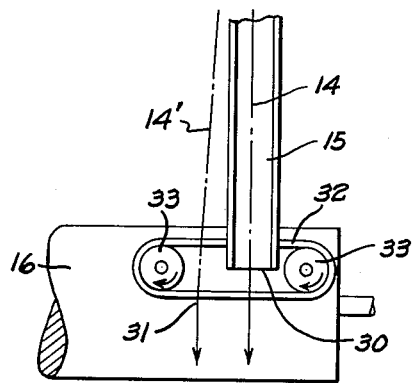
FIG. 7 is a top view of a modified form of the apparatus.

The basic processes of the invention can be simply described as comprising a number of operations. These operations involve the formation of a new filament in substitution for a broken predecessor, the automatic disposition of this filament in a configuration which facilitates its integration into the strand and, finally, the integration of the filament into the strand. These operations are integrated and continuous, and preferably automatic.

One stage of the process of the invention is illustrated in front view FIG. 1 and side view FIG. 2. Illustrated in these figures is a series of filaments 10 emanating from orifices, not shown, and joining at junction 11. For simplicity only three filaments of the series are shown. The strand 12 thus formed and originating at junction 11 is guided by suitable means to a bobbin, not shown.

Also illustrated in FIGS. 1 and 2 is a filament 14 which has been newly formed, its predecessor having been broken or otherwise terminated. This filament 14 is shown in its early stage of inception: it has been drawn from an orifice, not shown, by a newly formed drop of glass which has dropped vertically from the orifice and has then been guided down inclined channel 15, over guide roll 16 to be gripped and taken up by drum 17 and drawn into a filament of proper thickness. The initial drop of glass which carried filament 14 is removed by suitable means and the filament is wound about the rotating drum 17. To prevent the new filament from engaging and perhaps disrupting the production of strand 12, the strand and its component filaments 10 are displaced from the vertical as indicated in the figures.

The stage of the process as thus described embraces the formation of a new filament 14 and its storage on drum 17. Subsequent stages will involve the guiding of filament 14 into contact with strand 12 to thus replace the predecessor of that filament. Involved in this operation in addition to the elements heretofore described are filament guide 18, guide rod 19 and cutter 20.

During the above-described formation of filament 14, the guide 18 provided on a guide rod 19 is moving in the direction A, FIG. 2, toward the new filament 14 and on reaching a position behind the newly formed filament, after having been turned towards it in the direction of the arrow B, FIG. 3, grips the filament to lift it from the channel 15 and to pass it under tension in the direction of the arrow C of FIG. 4 to the strand 12. The filament is simultaneously being wound on the rotating drum 17 in such manner that the leading end 21, FIG. 4, extends in a substantially vertical plane over the surface of the drum 17.

As soon as the guide 18 is exactly behind the strand 12, it is turned in the direction of the arrow D, FIGS. 5 and 6, until the filament 14 is taken up by the strand 12 and integrated. At this moment the connection of filament 14 to drum 17 is broken, the severed end being shown at 22, FIGS. 5 and 6. To break the connection a cutting device 20 operating in synchronism with the guide rod 19 may be provided.

It will be also understood from FIGS. 1 through 6 that the individual filaments 10 subsequently combined in the strand 12 are advantageously moved away from the vertical plane or fall of the filament-entraining drops 23, shown in FIGS. 5 and 6. They can assume a harp-shaped form, or may be fanned out as indicated by the angle K shown in FIG. 2. Room is thus provided for filaments newly formed after a filament has broken, the falling drops 23 being thus prevented from passing into the zone of the filaments 10 and thereby tearing them. The forward movement of the guide 19 in the direction A, FIG. 2, its return movement in the direction C, FIG. 4, and its rotational movement in the directions B and D, FIGS. 3, 5 and 6, proceed automatically and continuously under the influence of suitable control means. If the cutting device 20 is provided, its operation is also automatic. The selected speed of the guide 19 is advantageously high, the fact that the guide may often run idle or empty being deliberately accepted since it is thus insured that any newly formed filament can be gripped and passed to the strand directly after its formation so that the gap left by a broken filament is quickly filled.

The guide roll 16 may rotate at the same peripheral speed as the spinning drum 17, or the peripheral speed of the guide roll may be slightly higher than that of the spinning drum. This condition has often been found to be of advantage inasmuch as a resilient and smaller drawing-off of the filament 14 is insured by the slip thus produced. The spinning drum 17 is, however, advantageously operated at the same peripheral speed as or at a slightly lower peripheral speed than that of the bobbin, not shown, on which the strand is wound, so that the newly formed filament 14 introduced into and taken up by the drawn-off strand 12 is at once severed from its connection to the spinning drum 17.

FIG. 7 shows apparatus for carrying out a modification of the method of the invention.

In this construction the filament 14 in the channel 15, instead of being gripped by the guide 18, FIGS. 1–6, directly below the channel edge 30, FIG. 7, at a position between the channel edge 30 and the guide drum 16, is rather gripped at a laterally displaced position, for example at the position 31, FIG. 7. In this manner the still hot glass drop of the filament 14, or the drop of the next filament succeeding it in the channel 15, cannot damage the oil cloth which is on the guide 18. The guide 18 is lined with this oil cloth which operates as a gripping device and is made of an absorptive material such, for example as felt, for insuring that the gripped filament running over the guide may be continuously wetted with binding agent. The wetting process is illustrated in FIG. 8 which indicates diagrammatically a tube 34 through which the binding agent issuing at 35 is passed to the filament 14 as well as to the conveyor belt 32.

Figure 8:
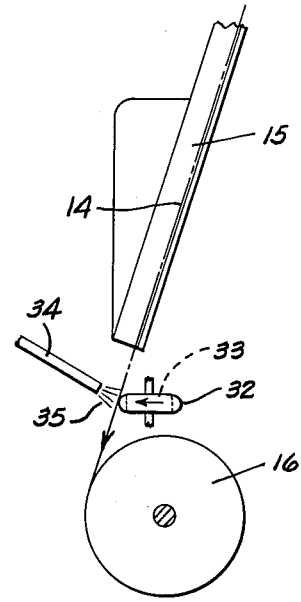
FIG. 8 is a side elevation of the apparatus of FIG. 7.

In the embodiment illustrated in FIGS. 7 and 8 a conveyor belt 32 is provided, which may run on wheels, cylinders, discs, pulleys or the like 33, and which may advantageously also be made of a material, for example of felt, which absorbs the binding agent. The filament 14 is moved away from the plane of the line of fall of the hot drops until it is taken up by the guide 18, as for example at the position 14'. It is for this purpose an advantage to run the conveyor belt 32 at a very low peripheral speed, continuously or intermittently, such that, with the exetremely high working speed of the thread guide, it is thus insured that the filament is safely engaged or gripped.

Any other device which operates in the same or in a similar way may also be used to carry out this step of the method of the invention. Thus, for example, the conveyor belt 32 may be replaced by a suitable circular disc, by a toothed wheel, or by a worm or the like, the selected means being located at a suitable position.

It is also possible, for starting a new filament after the snapping of its predecessor, to utilize a single rotating drum. In such a case, however, it is necessary for the diameter of the drum to exceed that of the drums 16 and 17 shown in FIGS. 1 to 6.

Figure 9:
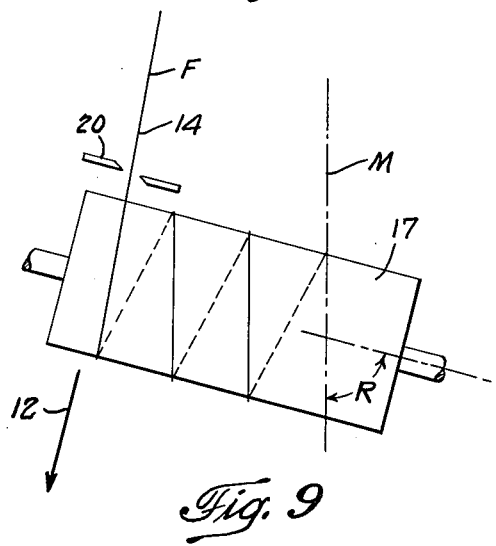
FIG. 9 is a drawing partly in cross-section showing another modified form of the apparatus.

If the process is carried out with a single drum 17 it may as shown in FIG. 9 be disposed with its longitudinal side at an angle R to the perpendicular M. This affords the advantage that the filament, after having moved on to the periphery of the drum 17, runs up the drum automatically to the position F at which it breaks, or where it is cut by the burner 20 so as to be then introduced into the strand 12.

Figure 10:
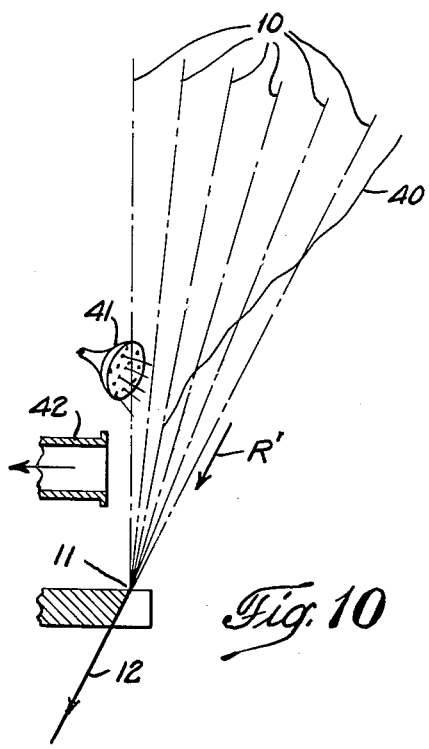
FIG. 10 is a front elevation showing a modification of parts of the apparatus.

When a filament breaks there remains, after the formation of the new filament, a torn end which may be of considerable length. In accordance with the method of the invention, means are provided to return this torn end as well to the strand of filaments 12. In FIG. 10 is diagrammatically shown the method of achieving this. The broken filament 40 is pulled in by the strong air suction indicated by the arrow R and produced by the drawing effect of the fanned-out filaments 10. At the position at which they converge more closely, the fanned-out filaments are advantageously sprayed with binding agent, for example, in a finely atomized state, as by means of the spray 41.

The suction effect, produced by the drawing process of the filaments 10 and indicated in FIG. 10 by the arrow R, may if desired be increased by suitable means, as for example by the suction pipe 42, the suction of which may be adapted to be controlled and to be switched on or off as desired.

The invention in its broader aspects is not limited to the specific steps, methods, compositions and improvements shown and described herein, but departures may be made therefrom within tthe scope of the accompanying claims without departing from the principle of the invention and without sacrificing its chief advantages.

What we claim is:

1. In the production of strands from filaments, means for introducing a new filament into said strand in substitution for a broken filament comprising filament storing and drawing means for taking up and attenuating said filament as it is produced, filament displacing means for moving said filament into juxtaposition with said strand including a filament guide which engages said filament and moves said filament into contact with said strand, and means for disconnecting the stored section of said filament from said strand.

2. Apparatus according to claim 1, in which said storing and drawing means comprise rotary drum means.

3. In the production of strands from filaments of thermoplastic, means for introducing a new filament into said strand in substitution for a broken filament comprising inclined guiding means provided in the line of fall of the drops entraining said new filaments, drawing and storing means, rotary starting means disposed below said inclined guide means and operable to contact and impel said new filaments in the direction of said drawing and storing means, said drawing and storing means being operable to take up and attenuate said new filaments, and a filament guide operable to engage said new filament and move said filament into contact with said strand.

4. Apparatus according to claim 3, in which the movement of said filament by said filament guide occurs simultaneously with the storing of said filament.

5. Apparatus according to claim 3, in which said filament guide comprises a reciprocating and rotatable thread guide which operates automatically and in synchronism with said storing means.

6. Apparatus according to claim 3, in which the peripheral speed of said drawing and storing means is equal to or less than the linear speed of said strand.

7. Apparatus according to claim 3, in which the drawing and storing means comprises a rotary drum, the starting means comprises a rotary drum, and the speeds of said drums are substantially equal.

8. In the production of a strand package, the strand formed from a plurality of separate filaments of glass or similar thermoplastic material produced by falling drops of said material, said falling drops forming attenuated filaments of molten material, the method of introducing a new filament into said strand before packaging in substitution for a predecessor filament which has been broken comprising the steps of separating the drop of material forming said new filament from the region wherein said plurality of filaments are formed into said strand, drawing said new filament until a predetermined diameter thereof is obtained, introducing the portion of said new filament of predetermined diameter into said strand adjacent said strand forming region, disconnecting said portion of new filament from its associated forming drop upon said introduction whereby said strand is formed completely of filaments having a predetermined diameter and spooling said strand into a package.

9. The method as defined in claim 8 including the step of conjointly drawing and storing said new filament until said predetermined diameter is obtained.

10. The method as defined in claim 8 including concurrently servering said new filament from its associated forming drop upon introduction into said strand.

11. In the production of strands from a plurality of filaments, means for introducing a new filament into said strand in substitution for a broken filament comprising means for separating the initially formed section of said new filament from the region of said plurality of filaments, means for drawing said new filament into predetermined diameter, means for transporting the section of said filament of predetermined diameter into receiving relationship with respect to said strand including a filament guide for engaging said filament and moving it into contact with said strand, and means for disconnecting said initially formed section from the section of predetermined diameter upon introduction of said section of predetermined diameter into said strand.

12. The invention as defined in claim 11 including an inclined rotatable drum for drawing said new filament into predetermined diameter, for storing sections of said filament preceding said predetermined diameter, and for transporting the section of said filament of predetermined diameter into receiving relationship with said strand.

13. The invention as defined in claim 11 wherein said separating means includes an inclined guide member for supporting said newly-formed filament and means supporting said guide member in angular displaced relation to said formed strand.

14. The invention as defined in claim 11 wherein said drawing includes storing means comprising a pair of coacting opposed rotatable drums.

15. The invention as defined in claim 13 including conveying means for initially moving said newly-formed filament away from said guide member prior to engagement by said transporting means.

References Cited in the file of this patent

UNITED STATES PATENTS

| | | |
|---|---|---|
| 2,255,426 | Lamesch | Sept. 9, 1941 |
| 2,386,158 | Collins | Oct. 2, 1945 |
| 2,535,561 | Bastian | Dec. 26, 1950 |
| 2,609,320 | Modigliani | Sept. 2, 1952 |
| 2,630,976 | Keight | Mar. 10, 1953 |
| 2,711,054 | Urbanetti | June 21, 1955 |
| 2,838,879 | Schuller | June 17, 1958 |
| 2,846,157 | Stephens et al. | Aug. 5, 1958 |
| 2,880,457 | Schuller | Apr. 7, 1959 |